United States Patent [19]

Drako et al.

[11] Patent Number: 5,291,582
[45] Date of Patent: Mar. 1, 1994

[54] APPARATUS FOR PERFORMING DIRECT MEMORY ACCESS WITH STRIDE

[75] Inventors: Dean Drako, Cupertino; Steven Roskowski, Sunnyvale, both of Calif.

[73] Assignee: Apple Computer, Inc., Cupertino, Calif.

[21] Appl. No.: 874,747

[22] Filed: Apr. 27, 1992

Related U.S. Application Data

[63] Continuation of Ser. No. 616,887, Nov. 21, 1990, abandoned.

[51] Int. Cl.⁵ .................. G06F 12/00; G06F 12/02; G06F 12/06
[52] U.S. Cl. .................. 395/425; 364/242.2; 364/242.31; 364/927.2; 364/927.4; 364/927.63; 364/DIG. 1; 364/DIG. 2; 365/230.03; 395/157; 395/166; 345/200
[58] Field of Search .................. 364/DIG. 1 MS File, 364/ DIG. 2 MS File, 927.2, 927.4, 927.63, 242.2, 242.31; 365/230.03; 395/425, 157, 166; 340/799

[56] References Cited

U.S. PATENT DOCUMENTS

| | | | |
|---|---|---|---|
| 4,454,593 | 6/1984 | Fleming et al. | 364/DIG. 2 |
| 4,559,611 | 12/1985 | Ostapko | 364/DIG. 2 |
| 4,574,364 | 3/1986 | Tabata et al. | 364/DIG. 2 |
| 4,660,154 | 2/1987 | Dodge | 364/DIG. 2 |
| 4,827,445 | 5/1989 | Fuchs | 364/DIG. 2 |
| 4,845,640 | 7/1989 | Ballard et al. | 364/DIG. 2 |
| 4,920,504 | 4/1990 | Sawada et al. | 395/166 |
| 4,933,877 | 6/1990 | Hasebe | 395/166 X |
| 4,965,751 | 10/1990 | Thayer et al. | 364/DIG. 2 |
| 5,020,003 | 5/1991 | Moshenberg | 364/DIG. 2 |
| 5,148,523 | 9/1992 | Harlin et al. | 364/DIG. 2 |
| 5,157,775 | 10/1992 | Sanger | 364/DIG. 2 |

*Primary Examiner*—Joseph L. Dixon
*Assistant Examiner*—B. Peikari
*Attorney, Agent, or Firm*—Blakely, Sokoloff, Taylor & Zafman

[57] ABSTRACT

A direct memory access controller including apparatus for storing an address to which information is to be written or from which information is to be read, apparatus for storing data related to the address, apparatus for storing a value indicative of a width of a block of data to be transferred, apparatus for storing a value indicative of a total amount of information to be transferred, apparatus for storing a value indicating a number of addresses to be bypassed during a transfer, apparatus for incrementing the address while decrementing the value indicative of the width of the block and the value indicative of the total amount of information to be transferred until the width of the block has been crossed, and apparatus for changing the address by the value indicating a number of addresses to be bypassed during a transfer when the width of the block has been crossed, and apparatus for resetting the value indicative of a width of a block of data to be transferred to the original value when the width of the block has been crossed.

3 Claims, 4 Drawing Sheets

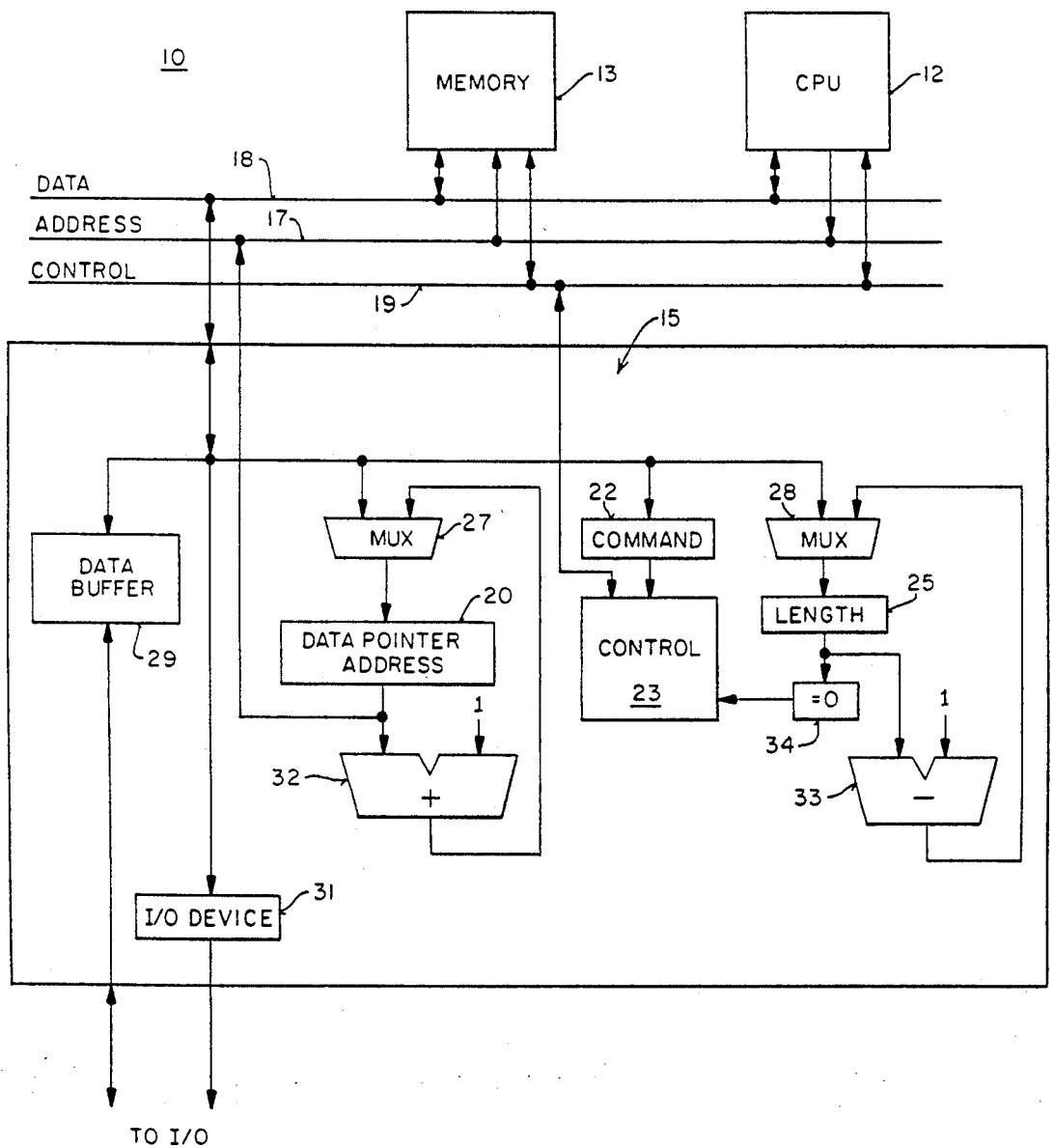
FIG _1 (PRIOR ART)

FIG_2A
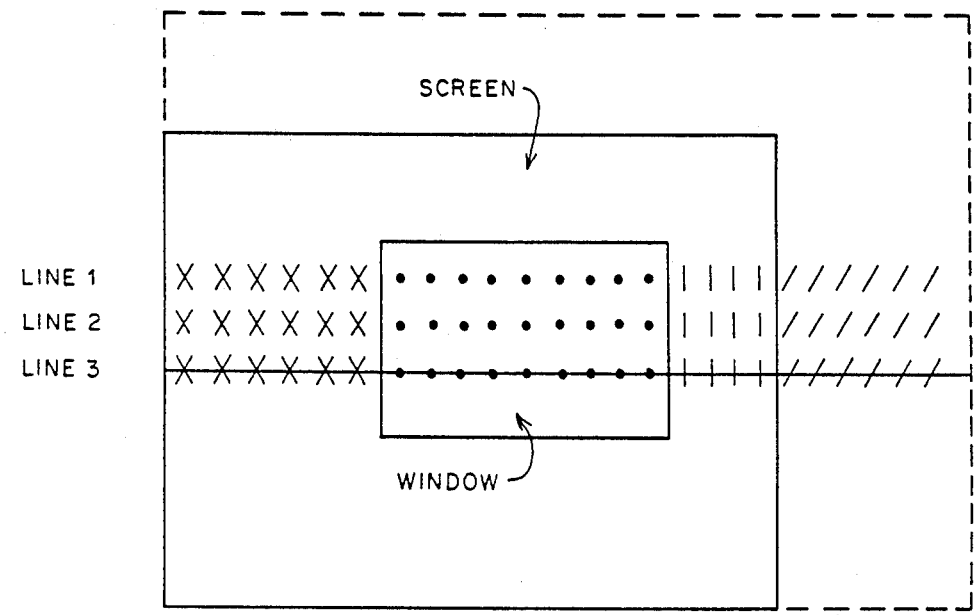
FIG_2B
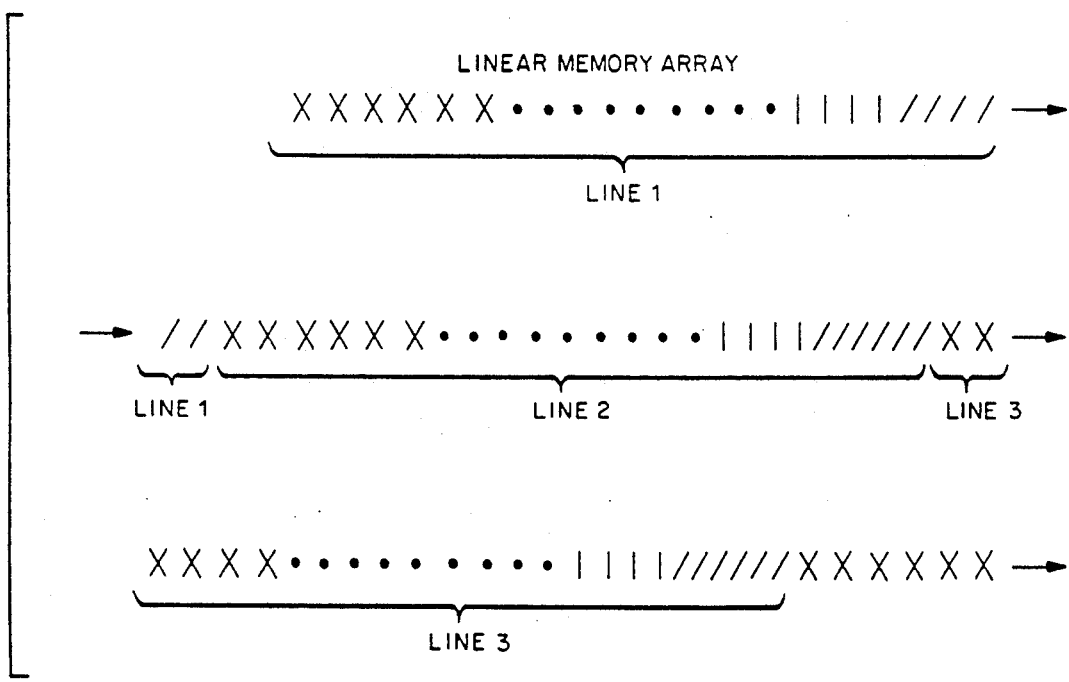

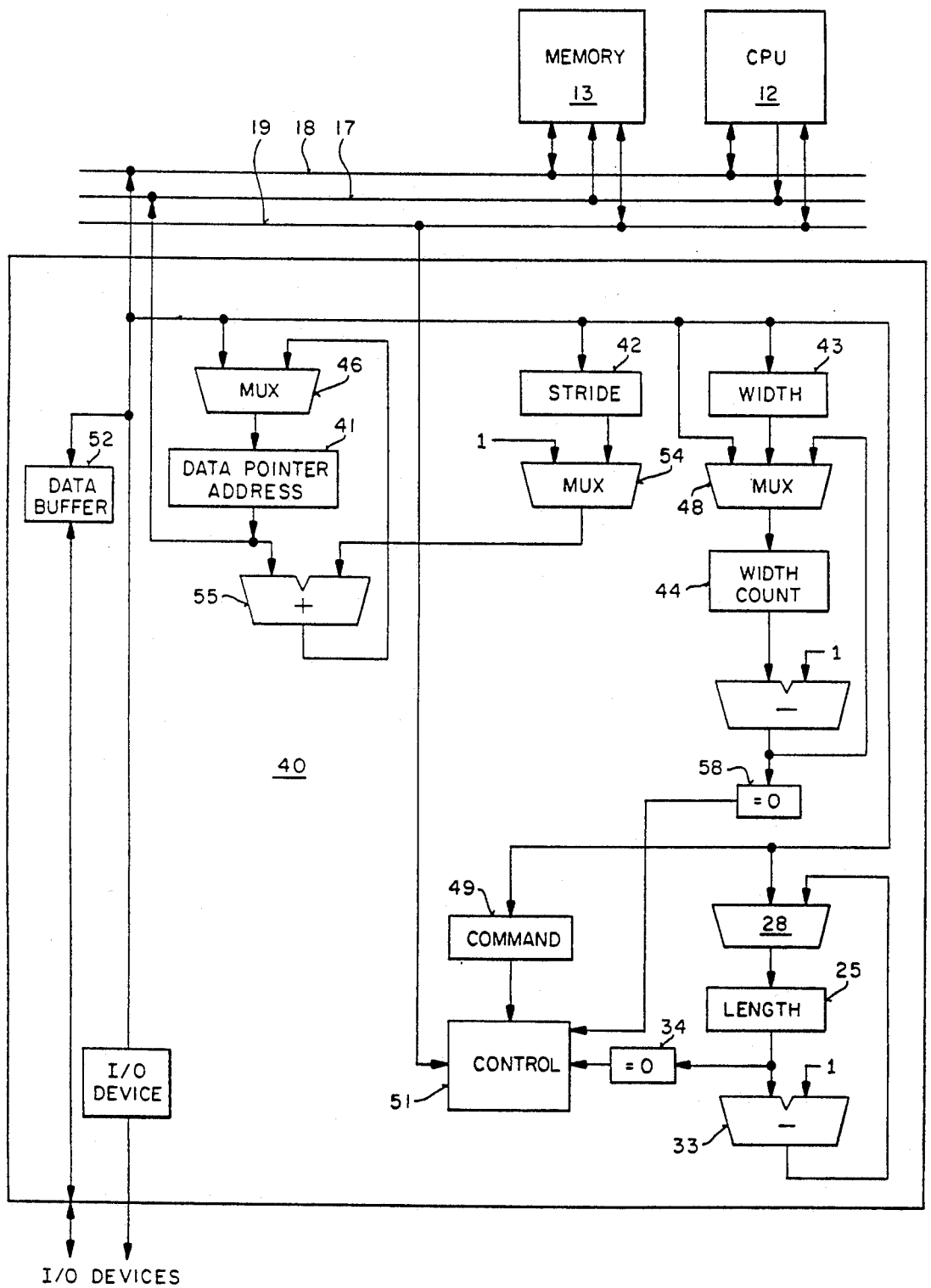
FIG_3

FIG_4
| ADDRESS | LENGTH | STRIDE | W. COUNT | WIDTH |
|---------|--------|--------|----------|-------|
| 4000 | 1000 | 40 | 50 | 50 |
| 4001 | 999 | 40 | 49 | 50 |
| ⋮ | ⋮ | ⋮ | ⋮ | ⋮ |
| 4049 | 951 | 40 | 1 | 50 |
| 4090 | 950 | 40 | 50 | 50 |
| 4092 | 949 | 40 | 49 | 50 |
| ⋮ | ⋮ | ⋮ | ⋮ | ⋮ |
| 4139 | 901 | 40 | 1 | 50 |
| 4180 | 900 | 40 | 50 | 50 |
| ⋮ | ⋮ | ⋮ | ⋮ | ⋮ |
| 5799 | 1 | 40 | 1 | 50 |
| 5800 | 0 | 40 | 50 | 50 |
FIG_5
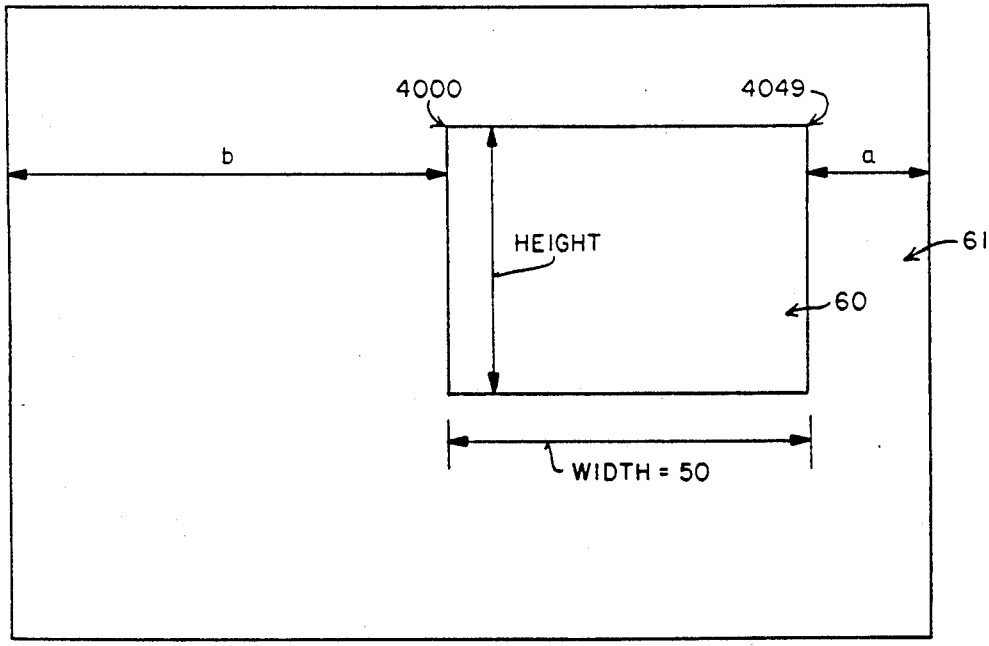
STRIDE = a+b
LENGTH = HEIGHT x 50

APPARATUS FOR PERFORMING DIRECT MEMORY ACCESS WITH STRIDE

This is a continuation of application Ser. No. 07/616,887, filed Nov. 21, 1990 now abandoned.

BACKGROUND OF THE INVENTION

1. Field of the Invention

This invention relates to direct memory access apparatus and, more particularly, to improved apparatus for rapidly transferring information from an input device to a rectangular region of memory or from a rectangular region of memory to an output device.

2. History of the Prior Art

A typical direct memory access (DMA) controller moves information between an external peripheral device and main memory. Such a device is customarily used to relieve the central processing unit of the duty to transfer large blocks of information between peripheral devices and main memory. It may also be used for transferring information to other memory positions such as a frame buffer. In modern computers adapted to handle information from many different sources, it is often desirable to transfer information from an external device such as a source of television signals so that the information may be displayed in a window on an output display device. It is desirable that a DMA controller be used to accomplish this transfer.

When transferring data from an input device to memory, a DMA controller will receive a sequence of data from the input device. It will place the data into memory at a specified destination address. It will increment the destination address after each word has been transferred thereby placing the data into a contiguous block of memory. When transferring data from memory to an output device, a DMA controller will read data from a specified source address in memory. It will place the data in the output device at the specified destination. It will increment the source address after each word has been transferred thereby transferring a contiguous block from memory to the output device.

In contrast to main memory or other typical random access memory, a frame buffer also provides serial pixel output on a line by line basis for transfer to an output display so that a consistent graphical picture may be displayed. When a process or program provides information which is to be displayed on a graphical display in a rectangular portion (a window) which is less than the entire picture, the pixels defining the window are stored in the frame buffer so that the window is scanned out line-by-line as the frame buffer data is scanned to the display. However, the position of the window on the display may be anywhere within the overall screen display. Typically, the window will be a rectangle which is to be positioned at some X-Y starting position other than the upper left hand corner of the display and will take up a certain width and height on the display. The addresses for the pixels defining the window within the frame buffer are not usually a block of contiguous addresses in the frame buffer.

In general, frame buffer memory is made up of a set of linearly arranged addresses. These addresses are divided into groups each of which defines one horizontal line on the display. The information in a rectangular window (hereinafter referred to as a rectangular portion of memory), is thus made up of a number of clusters including a number of sequential pixels appearing in the same position within a number of sequential groups defining lines on the display. Since the rectangular window may appear anywhere on the display, each set of sequential pixels forming a line in a window is separated in the frame buffer from the next set of sequential pixels forming the next line in the window by pixels not within the window. These are at least the pixels in each line of the display leading up to the edge of the window, both to the left and to the right. It is for this reason that the pixels forming the lines within a rectangular window or other rectangular portion of memory are not in one contiguous block.

Since a DMA controller places the first piece of information at the first destination address, increments the address by one, places the next piece of information at that address, and continues incrementing in order addresses within the memory device, a DMA controller is able only to address a block of sequential addresses. Since a DMA controller is unable to skip over the space in the memory to which information is not to be written, a DMA controller is not used where the information is being placed in a window of a frame buffer or other rectangular portion of other memory. For example, were one to attempt such a use for filling a window in a frame buffer less than the full width of the display, the processor controlling the transfer would have to intervene and provide a new starting address for each scan line of the window to be presented on the output display. This requires a significant amount of time to be spent by the processor, time essentially wasted in so far as actually transferring any information.

SUMMARY OF THE INVENTION

It is, therefore, an object of the present invention to allow a DMA controller to be used for transferring information from an input device to a rectangular region of memory or from a rectangular region of memory to an output device.

It is another more specific object of the present invention to provide a DMA device which is able to skip over selected spaces in memory arrays to which information is being transferred without intervention by a controlling device.

These and other objects of the present invention are realized in a direct memory access controller comprising means for storing an address to which information is to be written or from which information is to be read, means for storing data related to the address, means for storing a value indicative of a width of a block of data to be transferred, means for storing a value indicative of a total amount of information to be transferred, means for storing a value indicating a number of addresses to be bypassed during a transfer, means for incrementing the address while decrementing the value indicative of the width of the block and the value indicative of the total amount of information to be transferred until the width of the block has been crossed, and means for changing the address by the value indicating a number of addresses to be bypassed during a transfer when the width of the block has been crossed, and means for resetting the value indicative of a width of a block of data to be transferred to the original value when the width of the block has been crossed.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a circuit diagram illustrating a DMA device constructed in accordance with the prior art.

FIGS. 2(a) and 2(b) are illustrations of an output display and the memory in which the graphics information presented on the display is stored.

FIG. 3 is a circuit diagram illustrating a DMA device constructed in accordance with the invention.

FIG. 4 is a table which may be useful in illustrating the operation of the invention.

FIG. 5 is a diagram of a frame buffer useful in illustrating the operation of the invention.

NOTATION AND NOMENCLATURE

Some portions of the detailed descriptions which follow are presented in terms of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Referring now to FIG. 1, there is illustrated a circuit 10 constructed in accordance with the prior art. The circuit 10 includes a central processing unit 12, main memory 13, and a DMA controller 15. Each of the central processing unit 12, the main memory 13, and the DMA controller 15 are joined by a system address bus 17 and a system data bus 18. A set of control lines 19 are used to convey control signals between the system components. In the operation of the circuit 10, the central processing unit 12 directs the DMA controller 15 to carry out various information transfer operations which if accomplished by the central processing unit 12 would require a significant amount of processor time. For example, large block transfers of information are usually carried out by the DMA controller 15; and the central processing unit occupies itself with other functions during the time of such transfers.

In order to be able to accomplish such transfers, a typical DMA controller 15 includes a data pointer address register 20, a command register 22, a control circuit 23, and a length register 25. The central processing unit 12 furnishes an address at which information is to be retrieved (read) or to which information is to be transferred (written) to the data pointer address register 20 by means of a multiplexer 27. The operation to be accomplished is also written to the command register 22 on the data bus 18, and the amount of information to be transferred is written by the central processing unit 12 to the length register 25 through a multiplexer 28. The command in the command register 22 is interpreted by the control circuit 23 which controls the operation of the multiplexers 27 and 28 and other circuitry of the DMA controller 15 in a well known manner to accomplish the operations explained herein. The control circuit may be a state machine adapted to carry out the particular operations, for example. Assuming a read operation, the control circuit 23 causes the data at the addressed position to be read and placed in a data buffer 29 from which it is transferred to the output device, not shown. If a number of output devices exist to which information may be transferred, an input/output device register 31 may be included in the DMA controller 15 to receive an address designating which of the output devices is to receive the information and at what address.

When information is to be transferred, the first byte (or word or other portion of information) is placed in the data buffer 29, the address in the data pointer address register 20 is transferred to an adder 32 where it is incremented to the next address in the block of data to be transferred. Simultaneously, the length of the block of data is reduced by one element in a subtracter circuit 33. The new address is placed in the data pointer address register 20 by the multiplexer 27 while the new length is placed in the length register 25 by the multiplexer 28. The control circuit 23 then causes the next increment of data at the new address to be transferred to the data buffer 29 and to the output device. This operation continues until the length in the length register 25 has been counted to zero signifying that the end of the block has been reached. At this point, the central processing unit 12 may provide new information to the DMA controller 15 for its next transfer of information.

When DMA devices are used for transferring graphic information, a particular problem arises. A typical DMA controller is only able to address blocks of information the addresses of which are in sequential order. Consequently, DMA controllers are not typically used for transferring rectangular blocks of information where the addresses are not all contiguous. To use a typical DMA device to place information into a block of memory (such as a window in a frame buffer) which is less than all of the memory, it would be necessary for the central processing unit or other device controlling the DMA controller to load new values on each scan line to cause the DMA controller to skip those addresses of the memory to which information is not directed when the block is written. This would work but generally demands too much attention by the processor.

In order to better illustrate the problem, FIGS. 2(a) and (b) are included. FIG. 2(a) illustrates a window of graphical information which is to be presented on an output display. The dotted portions within the window are pixels which are to be presented within the window. The portions marked with |||| are empty pixels of the scan line to the right of the small window. The portion marked ||||  outside of the display represents a portions of overscan which may be used for horizontal retrace. The portion marked with XXXX represents empty pixels on the display to the left of the window. FIG. 2(b) illustrates a portion of a memory array in which pixel information is stored linearly in sequential addresses. When the pixel information in a window as in FIG. 2(a) is stored in a linear memory as in FIG. 2(b), it will be seen that each line of pixels in a window (the dotted portions) which are to appear on the display appears in a separate sequence of positions in the memory array, each sequence of positions being separated by a number of addresses used for elements of the display outside the window or overscan. Consequently, a DMA controller cannot transfer an entire window to such a memory array without the direction of the central processing unit on each scan line because a DMA controller can only write to sequential addresses. It cannot skip over the space to which data is not to be written.

In order to allow the use of a DMA controller for transferring blocks of data without the need for a processor to intervene on each line of the block transfer, the DMA controller 40 of FIG. 3 has been conceived. The DMA controller 40 includes a data pointer address register 41, a stride register 42, a width register 43, a width count register 44, and a length register 25. Presuming that a processor (such as a central processing unit) is providing information to set up a data transfer from an input/output device to a window in a frame buffer, the address of the upper left XY coordinate of the window is furnished on the data bus 18 to the data pointer address register 41 via a multiplexer 46. A stride value is furnished by the processor to the stride register 42, an initial width is written both to the width register 43 and through a multiplexer 48 to the width count register 44 by the processor, and a length value is placed in the length register 25 using the multiplexer 28. A command is placed in a command register 49 and is interpreted by a control circuit 51. The control circuit 51 causes the information furnished by an input/output device and held in a data buffer 52 to be written to the address held in the data pointer address register 41. This address is the first position of the block within the memory array to which the data is being written. The controller 51 then causes a multiplexer 54 to furnish a value to an adder 55 to increment the address in the data pointer address register 41 by one address and returns the value to the data pointer address register 41 via the multiplexer 46. Simultaneously, the control circuit 51 causes the width count in the width count register 44 to be decremented by one using a subtracter 57 and furnishes the decremented value to the width count register 44 through the multiplexer 48. The initial value in the width count register 44 is equal to the number of individual pieces of data to be placed on each line of the particular block to which the block of data is being written. At the same time, the value in the length register 25 is reduced by one using the subtracter 33. The DMA controller 40 continues this operation of incrementing the address by one and writing the next pixel until the width of a first line in the memory has been traversed. The completion of a line is indicated by the value of the width count in the width count register 44 going to zero; this is indicated to the control circuit 51 by a comparator 58.

When the width count indicates that a line has been completed, the control circuit 51 causes the value in the stride register 42 to be added to the address in the data pointer address register 41. The stride value in the stride register 42 is set equal to the total of the number of addresses to be skipped by the DMA controller 40 to move the next pixel to the starting point on the next line of the memory. FIG. 5 illustrates a window 60 placed in a memory array 61. The stride value is equal to the sum of the addresses in distance "a" and distance "b" which measure the width of the areas outside the window 60. It will be seen that the addition of the stride value to the address of the last pixel in the window 60 on the first line describing that window 60 will produce the address of the first pixel in the window 60 on the second line.

At the same time that the control circuit 51 causes the address in the data pointer address register 41 to be increased by the stride value, the control circuit 51 causes the multiplexer 48 to furnish the value in the width register 43 to the width count register 44 so that a new total width is provided for the next line. The operation then continues to write a pixel to each succeeding address on the line until that second line is complete and the comparator 58 signals this to the control circuit 51. The control circuit 51 then adds the value in the stride register 42 to the data pointer address register 41 so that the DMA controller 40 precedes to write values to the next line of the memory array. In each case as the end of a line of the window is reached, the DMA controller 40 automatically precedes to the next line without requiring any intervention by the central processing unit or other processor. Consequently, the operation of the DMA controller 40 and of the system including the DMA controller 40 precedes at a much faster rate than in systems using prior art DMA controllers. The entire operation continues until the value in the length register 25 has been counted to zero as indicated by the comparator 34 to the control circuit 51.

FIG. 4 includes a table illustrating the operation of the DMA controller 40 in carrying out a transfer of data in which a block of data is placed in a memory array. The particular block of data has a length of one thousand pixels, and a width of fifty pixels. It is placed in an isolated position in which the stride is forty pixels in total. The first address to which the block sent is 4000. As may be seen, at this position, the length register 25 holds a value of 100, the data pointer address register 41 a value of 4000, the stride register 42 a value of 40, the width count register 44 a value of 50, and the width register 43 a value of 50. With each step as the block is written to the memory array, the address in the data pointer address register 41 increases by one, the length in the length register 25 decreases by one, the width count in the width count register 44 decreases by one, while the values in the length and width register stay the same. This continues until one line of the block has been completed, and the value in the width count register is ready to go to zero. At this point, the address in the data pointer address register 41 is increased by the amount of the stride to 4090, the width is reset to 50, and the length is decremented by a single value.

The operation then precedes as before through the next line, reducing the length and width count and increasing the address by one with each step. When the width of the line is about to go to zero again, the stride is added to the address in the data pointer address register 41 and the width count is reset to 50 in the width count register 44. The operation continues for the next line. The entire operation of writing a line, skipping a stride value and resetting the width count continues until the length of the block is exhausted. At this point the DMA controller 40 stops and must be restarted by a processor furnishing new commands to it. However, the entire operation of writing the block of information has taken place without any intervention by a processor. Consequently, the operation has preceded much more swiftly than that of prior art DMA devices. It will be recognized by those skilled in the art that the DMA devices provided by this invention are particularly suited to use in burst transfers of multiple words.

Although the present invention has been described in terms of a preferred embodiment, it will be appreciated that various modifications and alterations might be made by those skilled in the art without departing from the spirit and scope of the invention. For example, a modification of the arrangement illustrated in FIG. 3 may be made to provide a different DMA controller for transferring rectangular blocks of information. If the value used for the stride value is replaced by a value equal to the width of the memory and a register is provided for saving the address at which each line of memory starts, then the starting address for the previous line and the width of the memory may be added when the end of a line of the block is reached to provide the first address for the block on the next line. This is another method of implementing the jump from the end of one line to the beginning of the next and may be more suitable in particular computer systems. The invention should therefore be measured in terms of the claims which follow.

What is claimed is:

1. A direct memory access controller for controlling a linearly organized memory, the memory storing information for adjacent pixels in sequential addresses, the direct memory access controller comprising:
   a) means for storing an address to which information is to be written or from which information is to be read;
   b) means for storing a value indicative of a width of a block of data to be transferred;
   c) means for storing a value indicating a number of addresses to be bypassed during a transfer;
   d) means for incrementing the address while decrementing the value indicative of the width of the block until the width of the block has been crossed, the means for incrementing including;
      1) a first adder having an input coupled to an output of the means for storing an address and the first adder having an output coupled to an input of the means for storing an address;
      2) a first subtractor having an input coupled to the means for storing a value indicative of a width and an output coupled to the means for storing a value indicative of a width; and
      3) a comparator having an input coupled to the output of the first subtractor and the comparator having an output indicative of when the width of the block has been crossed;
   e) means for changing the address by the value indicating a number of addresses to be bypassed during a transfer when the width of the block has been crossed, the means for changing the address including;
      1) a multiplexor having a first input coupled to the means for storing a value indicating a number of addresses to be bypassed and a second input representing an amount by which to increment the address before the width of the block has been crossed, the multiplexor selecting the first input as the output when the width of the block has been crossed; and
   f) means for resetting the value indicative of a width of a block of data to be transferred to the original value when the width of the block has been crossed.

2. A direct memory access controller for controlling a linearly organized memory, the memory storing information for adjacent pixels in sequential addresses, the direct memory access controller comprising;
   a) means for storing an address to which information is to be written or from which information is to be read;
   b) means for storing a value indicative of a width of a block of data to be transferred;
   c) means for storing a value indicating a number of addresses to be bypassed during a transfer;
   d) means for incrementing the address while decrementing the value indicative of the width of the block until the width of the block has been crossed, the means for incrementing the address including;
      1) a first adder having an input coupled to an output of the means for storing an address and the first adder having an output coupled to an input of the means for storing an address;
      2) a first subcontractor having an input coupled to the means for storing a value indicative of a width and an output coupled to the means for storing a value indicative of a width; and
      3) a comparator having an input coupled to the output of the first subtractor and the comparator having an output indicative of when the width of the block has been crossed;
   e) means for changing the address by the value indicating a number of addresses to be bypassed during a transfer when the width of the block has been crossed; and
   f) means for resetting the value indicative of a width of a block of data to be transferred to the original value when the width of the block has been crossed, the means for resetting including;
      1) a multiplexor having a first input coupled to an output of the subcontractor and the multiplexor having a second input coupled to the means for storing a value indicating a number of addresses to be bypassed during a transfer, the multiplexor selecting as an output the second input when the width of the block has been crossed; and
      2) a width count register having an input coupled to the output of the multiplexor and having an output connected to the input of the first subcontractor.

3. A direct memory access controller for transferring a rectangular block of data to and from a linearly organized memory, the memory storing information for adjacent pixels in sequential addresses, the direct access memory controller comprising:
   a) an address pointer register for storing an address to which information is to be written or from which information is to be read;
   b) a width register for storing a value indicative of a width of a block of data to be transferred;
   c) a width count register having an input coupled to the width register;

d) a stride register for storing a stride value indicating a number of addresses to be bypassed during a transfer;

e) a length register for storing a value indicating a total amount of information to be transferred;

f) a first adder for incrementing the address pointer register until a vale of the width count register indicates that the width of the rectangular block has been crossed;

g) a first subtractor for decrementing the width count register until a value of the width count register indicates that the width of the rectangular block has been crossed;

h) a second subtractor for decrementing the length register until a value of the width count register indicates that the width of the rectangular block has been crossed;

i) a first multiplexor having an input coupled to the stride register and an output coupled to the first adder, the first multiplexor selecting the value of the stride register as the output when the width count register indicates that the width of the rectangular block has been crossed; and j) a second multiplexor having an first input coupled to the width register, a second input coupled to an output of the first subtractor, and an output coupled to the width count register, the second multiplexor resetting the width count register to the value stored by the with register when the width of the block has been crossed.

* * * * *